(12) United States Patent
Ji et al.

(10) Patent No.: US 9,264,502 B2
(45) Date of Patent: Feb. 16, 2016

(54) DOWNLOAD RESOURCE RECOMMENDATION METHOD, SYSTEM AND STORAGE MEDIUM

(71) Applicant: TENCENT TECHNOLOGY (SHENZHEN) COMPANY LIMITED, Shenzhen (CN)

(72) Inventors: Zufeng Ji, Shenzhen (CN); Gang Liu, Shenzhen (CN); Chenyuan Zhu, Shenzhen (CN)

(73) Assignee: TENCENT TECHNOLOGY (SHENZHEN) COMPANY LIMITED (CN)

( * ) Notice: Subject to any disclaimer, the term of this patent is extended or adjusted under 35 U.S.C. 154(b) by 0 days.

(21) Appl. No.: 14/373,003

(22) PCT Filed: Dec. 19, 2012

(86) PCT No.: PCT/CN2012/086906
§ 371 (c)(1),
(2) Date: Jul. 17, 2014

(87) PCT Pub. No.: WO2013/107238
PCT Pub. Date: Jul. 25, 2013

(65) Prior Publication Data
US 2014/0379808 A1    Dec. 25, 2014

(30) Foreign Application Priority Data

Jan. 20, 2012 (CN) .......................... 2012 1 0018761

(51) Int. Cl.
*G06F 15/16* (2006.01)
*H04L 29/08* (2006.01)
*G06F 17/30* (2006.01)
*H04L 12/26* (2006.01)

(52) U.S. Cl.
CPC ............ *H04L 67/22* (2013.01); *G06F 17/3053* (2013.01); *G06F 17/30699* (2013.01); *G06F 17/30867* (2013.01); *H04L 43/0876* (2013.01)

(58) Field of Classification Search
None
See application file for complete search history.

(56) References Cited

U.S. PATENT DOCUMENTS

2004/0093595 A1 *  5/2004  Bilange .......................... 717/171
2005/0071485 A1 *  3/2005  Ramagopal ................... 709/230

(Continued)

FOREIGN PATENT DOCUMENTS

CN          101105795 A       1/2008
EP          2375351 A1       10/2011

OTHER PUBLICATIONS

International Search Report issued Mar. 14, 2013 re: PCT/CN2012/086906; citing: CN 101105795 A, EP 2375351 A1 and US 2010/0005105 A.

*Primary Examiner* — Brian P Whipple
(74) *Attorney, Agent, or Firm* — Cantor Colburn LLP

(57) ABSTRACT

A method for recommending a download resource includes: obtaining a download record of a target user, obtaining a target user group associated with the target user according to the download record; obtaining download records of the target user group and download records of a global user group; processing the downloading records of the target user group and the download records of the global user group to generate, for a download resource in the download records of the target user group, a differentiation degree between the download resource in the download records of the target user group and the download resource in the download records of the global user group; and sorting download resources in the download records of the target user group according to the differentiation degree, and recommending the top-ranking predetermined number of download resources to the target user.

20 Claims, 2 Drawing Sheets

(56) References Cited

U.S. PATENT DOCUMENTS

| | | | |
|---|---|---|---|
| 2008/0253564 A1* | 10/2008 | Kahn et al. | 380/200 |
| 2008/0254739 A1* | 10/2008 | Kidd et al. | 455/3.01 |
| 2008/0256246 A1* | 10/2008 | Schlacht et al. | 709/228 |
| 2008/0256359 A1* | 10/2008 | Kahn et al. | 713/170 |
| 2008/0256615 A1* | 10/2008 | Schlacht et al. | 726/9 |
| 2010/0005105 A1 | 1/2010 | Zhang et al. | |

* cited by examiner

DOWNLOAD RESOURCE RECOMMENDATION METHOD, SYSTEM AND STORAGE MEDIUM

CROSS-REFERENCE TO RELATED APPLICATIONS

This application is a U.S. National Phase application under 35 U.S.C. §371 of International Application No. PCT/CN2012/086906, filed Dec. 19, 2012, entitled "DOWNLOAD RESOURCE RECOMMENDATION METHOD, SYSTEM AND STORAGE MEDIUM", the entire contents of which are incorporated herein by reference.

FIELD OF THE DISCLOSURE

The present disclosure relates to network techniques, and more particularly, to a method, a system and a storage medium for recommending a download resource.

BACKGROUND OF THE DISCLOSURE

With the development of telecommunications techniques, network bandwidth is increased dramatically. Therefore, a large amount of websites and client software providing download resources emerge. These websites and client software classify the download resources into different categories and present them to users. Users may download a download resource according to their requirements. The download resources may include software, video, audio, picture, text, etc. In order to facilitate the selection of the user, besides allowing the user to submit downloading request initiatively, the websites and client software also provide a download resource recommendation function, i.e., push some high quality download resources, such as hot films, hot games, frequently-used software, to a webpage or a client, so as to present the recommended download resources to the user.

In a conventional download resource recommendation method, the hot degree of a download resource is determined according to a download record of the download resource (the more times that the download resource is downloaded, the higher the hot degree). Then the download resources are sorted. Top N download resources (top N download resources whose hot degrees rank in first N, N may be determined according to a practical requirement) are recommended to the user. However, the download record merely statistically reflects interests of all users. Therefore, the user may be not interested in the download resource recommended to the user.

In a conventional improved downloading recommendation method, a score table (score matrix) is created first according to a score of each download resource given by each user. Then, according to a similarity degree between scores of different download resources, a target user group similar to a target user (a user that the download resource is to be recommended to) is determined. According to a whole interest of the group (e.g., scores of the download resources provided by users in the target user group), a download resource is recommended to the user.

Although this improved download resource recommendation method increases the correlation degree between the download resource and the user, it is hard to obtain the score of the download resource provided by the user (most users do not give a score after downloading the resource). In addition, the interest of the target user on the download resource is determined merely according to the overall interest of the target user group, which makes the target user and the download resource less correlated. Thus, the accuracy ratio of the download resource recommendation method is not high.

SUMMARY OF THE DISCLOSURE

In view of the above, an example of the present disclosure provides a method for recommending a download resource with a high accuracy ratio.

A method for recommending a download resource includes:

obtaining a download record of a target user, obtaining a target user group associated with the target user according to the download record;

obtaining download records of the target user group and download records of a global user group;

processing the downloading records of the target user group and the download records of the global user group to generate, for a download resource in the download records of the target user group, a differentiation degree between the download resource in the download records of the target user group and the download resource in the download records of the global user group; and sorting download resources according to the differentiation degree, and recommending the top-ranking predetermined number of download resources to the target user.

An example of the present disclosure provides a system for recommending a download resource with a high accuracy ratio.

A system for recommending a download resource includes:

a target user group obtaining module, adapted to obtain a download record of a target user and obtain a target user group associated with the target user according to the download record;

a download record obtaining module, adapted to obtain download records of the target user group and download records of a global user group;

a differentiation degree generating module, adapted to process the download records of the target user group and the download records of the global user group, so as to generate, for a download resource in the download records of the target user group, a differentiation degree between the download resource recorded in the download records of the target user group and the download resource recorded in the download records of the global user group; and a recommending module, adapted to sort download resources according to the differentiation degree, and recommend the top-ranking predetermined number of download resources to the target user.

An example of the present disclosure provides a non-transitory computer readable storage medium, comprising a set of instructions executable by one or more processors to direct the one or more processors to perform the method as described above.

In the download resource recommendation method, system and storage medium provided by examples of the present disclosure, a target user group that a target user belongs to is obtained firstly according to a download record of the target user. Then, according to a differentiation degree between downloaded times of the target user group and that of the global user group, a proper download resource is recommended to the target user. The target user has similar interest on the download resources with other users in the target user group. Therefore, if the differentiation degree between a download resource of the target user group and that of the global user group is relative large, the target user may be more interested in this download resource than users in the global user group. Thus, the accuracy ratio for recommending the download resource to the target user is increased.

DETAILED DESCRIPTION OF THE DISCLOSURE

Figure 1:
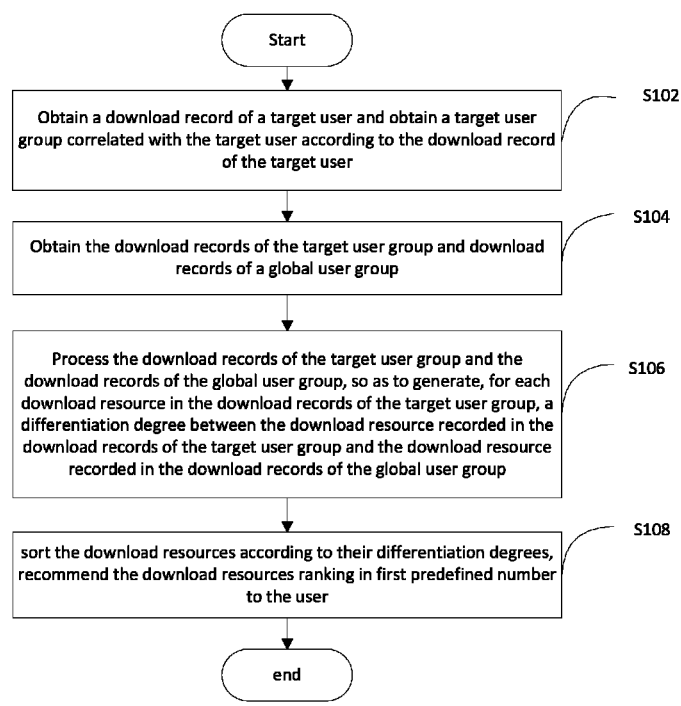
FIG. 1 is a flowchart illustrating a method for recommending a download resource according to an example of the present disclosure.

FIG. 1 is a flowchart illustrating a method for recommending a download resource according to an example of the present disclosure. As shown in FIG. 1, the method includes the following.

At block S102, a download record of a target user is obtained, and a target user group associated with the target user is obtained according to the download record.

The target user is a user that a download resource is to be recommended to. In one example, a recent download record of the target user may be obtained, e.g., a download record of a recent week or a recent month. The download record includes information such as which download resources have been downloaded by the target user and downloaded times of the download resources.

In one example, in block S102, download records of recent users are obtained, the download records of the users are traversed. For the download record of each user, a following operation is performed: comparing the download record of the user with the download record of the target user, obtaining a user whose download record matches with the download record of the target user, and adding the user obtained into the target user group.

Preferably, the download records of users which are active recently are obtained. The active user refers to a user whose active degree is higher than a predefined reference value. The user active degree may be a weighted average value of downloading times, online time, and downloading times each day. In particular, it is possible to determine active users periodically and store the active users in a user database.

The download record contains a name and/or a hash value and downloaded times of a download resource recently downloaded by each active user. The download records of the active users are traversed by taking each active user as a unit. If the download resource in the download record of the target user matches with that of the active user, the active user is added to the target user group.

Furthermore, a maximum user number may be configured for the target user group. If the number of users in the target user group reaches the maximum value, the traversing operation stops.

In addition, a resource hash value and/or a resource file name in the download record of the user may be obtained. The resource hash value and/or recourse file name in the download record of the user are compared with those of the target user, so as to obtain a user whose resource hash value and/or resource file name matches with those of the target user.

When the hash values of the download resources are compared, the hash value of the download resource recorded in the download record of the target user may be obtained firstly. Then, the hash value of the download resource of the target user is compared with that of the download resource recorded in the download record of the user being traversed, if they are the same, it is determined that they match; otherwise, it is determined that they do not match.

When the names of the download resources are compared, the name of the download resource recorded in the download resource of the target user and the name of the download resource recorded in the download record of the user being traversed may be obtained firstly. Then, a maximum common sub-string method is adopted to determine whether the two names match. For example, suppose that the maximum common sub-string is 0.5. If the name of the download resource recorded in the download record of the target user is "HA LI BO TE YU MO FA SHI", the name of the download resource recorded in the download record of the user being traversed is "HA LI BO TE YU HUO YAN BEI". The maximum common sub-string is "HA LI BO TE YU". Then the similarity degree is 5/8, which is larger than 0.5. It is determined that the two names match.

In addition, a threshold may be configured. During the traverse of the download records of the users, if the number of download resources of a user with resource hash values and/or resource file names match with those of the target user is higher than the threshold, the user being traversed is added into the target user group.

At block S104, the download records of the target user group and download records of a global user group are obtained.

The global user group may include all users. The number of users in the global user group may also be configured. According to the configured number, a relatively large user sample space is selected as the global user group. For example, it is possible to randomly select 10000 users as the global user group.

At block S106, the download records of the target user group and the download records of the global user group are processed, so as to generate, for each download resource in the download records of the target user group, a differentiation degree between the download resource recorded in the download records of the target user group and the download resource recorded in the download records of the global user group.

In one example, first downloaded times of the download resource recorded in the download records of the target user group is obtained. Second downloaded times of the download resource recorded in the download records of the global user group is obtained. A first user number of the target user group and a second user number of the global user group are also obtained. According to the first downloaded times, the second downloaded times, the first user number and the second user number, the differentiation degree between the download resource of the target user group and that of the global user group may be calculated as follows:

$$diff = \frac{(R1 - R2)}{\sqrt{\frac{R1 \times (1 - R1)}{M1} + \frac{R2 \times (1 - R2)}{M2}}}.$$

Wherein diff denotes the differentiation degree between the download resource in the target user group and that in the global user group. M1 denotes the first user number of the target user group. M2 denotes the second user number of the global user group. R1=N1/M1, wherein R1 denotes an average downloaded times of download resource R in the target user group, N1 denotes the first downloaded times of the download resource R in the target user group; R2=N2/M2, wherein R2 denotes an average downloaded times of the download resource R in the global user group, N2 denotes the first downloaded times of the download resource R in the global user group.

When R1>R2, diff is a positive number, which indicates that the target user group prefers the download resource R. The larger the value of diff, the download resource R is more worthy to be recommended. When R1<R2, diff is a negative number, which indicates that the target user group do not prefer the download resource R. The smaller the value of diff, the download resource R is less worthy to be recommended. The denominator acts as a gain factor, avoiding that R1 and R2 becomes too small when M1 and M2 are large, which will result in an unobvious differentiation degree.

In one example, block S106 may further include: determining the downloaded times of the download resources recorded in the download records of the target user group, selecting download resources whose downloaded times exceeding a first threshold.

In particular, before generating the differentiation degree and after obtaining the download records of the target user group, the download record of each user may be traversed. The downloading times of all users with respect to one download resource is accumulated to determine the downloaded times of one download resource in the target user group. Then, the download resources are sorted according to their downloaded times. The download resources whose downloaded times exceed the first threshold are retrieved as hot resources of the target user group.

When generating the differentiation degree, operations may be performed merely based on the hot resources in the target user group.

Through selecting the hot resources, the amount of data need to be processed during the generation of the differentiation degree is reduced, which lowers the scale of the computation and reduces unnecessary performance loss.

At block S108, the download resources are sorted according to their differentiation degrees, the top-ranking predetermined number of download resources are recommended to the user.

After the download resources are traversed, the download resources may be sorted according to their differentiation degrees in a descending order. Then top N download resources, i.e., download resources ranking in the first N are recommended to the user, wherein N is a predefined natural number.

Preferably, the number, size, and downloaded times of the download resources may be displayed in a user interface according to their differentiation degrees in the descending order, so as to facilitate the user to select and download.

In one example, before sorting the download resources according to the differentiation degrees, download resources in the target user group with differentiation degrees higher than a second threshold are selected. Through filtering the download resources with small differentiation degrees before the sorting operation, the number of download resources need to be sorted is reduced. Thus, the sorting efficiency is increased.

Figure 2:
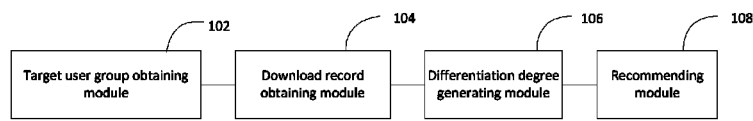
FIG. 2 is a schematic diagram illustrating a system for recommending a download resource according to an example of the present disclosure.

FIG. 2 is a schematic diagram illustrating a system for recommending a download resource according to an example of the present disclosure. As shown in FIG. 2, the system includes: a target user group obtaining module, a download record obtaining module 104, a differentiation degree generating module 106 and a recommending module 108.

The target user group obtaining module 102 is adapted to obtain a download record of a target user and obtain a target user group associated with the target user according to the download record.

The target user is a user that a download resource is to be recommended to. In one example, the target user group obtaining module 102 may obtain a recent download record of the target user, e.g., a download record of a recent week or a recent month. The download record includes information such as which download resources have been downloaded by the target user and downloaded times of the download resources.

In one example, the target user group obtaining module 102 may obtain download records of recent users and traverse the download records of the users. For the download record of each user, a following operation is performed: comparing the download record of the user with the download record of the target user, obtaining a user whose download record matches with the download record of the target user, and adding the user obtained into the target user group.

Preferably, the target user group obtaining module 102 may obtain the download records of users which are active recently. The active user refers to a user whose active degree is higher than a predefined reference value. The user active degree may be a weighted average value of downloading times, online time, and downloading times each day. In particular, it is possible to determine active users periodically and store the active users in a user database.

The download record contains a name and/or a hash value and downloaded times of a download resource recently downloaded by each active user. The download records of the active users are traversed by taking each active user as a unit. If the download resource in the download record of the target user matches with that of the active user, the active user is added to the target user group.

Furthermore, a maximum user number may be configured for the target user group. If the number of users in the target user group reaches the maximum value, the traversing operation stops.

In addition, the target user group obtaining module 102 may obtain a resource hash value and/or a resource file name in the download record of the user, compare the resource hash value and/or recourse file name in the download record of the user with those of the target user, so as to obtain a user whose resource hash value and/or resource file name matches with those of the target user.

When comparing the hash values of the download resources, the target user group obtaining module 102 may obtain the hash value of the download resource recorded in the download record of the target user firstly. Then, the target user group obtaining module 102 compares the hash value of the download resource of the target user with that of the download resource recorded in the download record of the user being traversed. If they are the same, it is determined that they match; otherwise, it is determined that they do not match.

When comparing the names of the download resources, the target user group obtaining module 102 obtains the name of the download resource recorded in the download resource of the target user and the name of the download resource recorded in the download record of the user being traversed firstly. Then, the target user group obtaining module 102 determines whether the two names match adopting a maximum common sub-string method. For example, suppose that the maximum common sub-string is 0.5. If the name of the download resource recorded in the download record of the target user is "HA LI BO TE YU MO FA SHI", the name of the download resource recorded in the download record of the user being traversed is "HA LI BO TE YU HUO YAN BEI". The maximum common sub-string is "HA LI BO TE YU". Then the similarity degree is ⅝, which is larger than 0.5. It is determined that the two names match.

In addition, a threshold may be configured. During the traverse of the download records of the users, if the number of download resources of a user with resource hash values and/or resource file names match with that of the target user is higher than the threshold, the user being traversed is added into the target user group.

The download record obtaining module 104 is adapted to obtain download records of the target user group and download records of a global user group.

The global user group may include all users. The number of users in the global user group may also be configured. According to the configured number, a relatively large user sample space is selected as the global user group. For example, it is possible to randomly select 10000 users as the global user group.

The differentiation degree generating module 106 is adapted to process the download records of the target user group and the download records of the global user group, so as to generate, for each download resource in the download records of the target user group, a differentiation degree between the download resource recorded in the download records of the target user group and the download resource recorded in the download records of the global user group.

In one example, the differentiation degree generating module 106 may obtain first downloaded times of the download resource recorded in the download records of the target user group, second downloaded times of the download resource recorded in the download records of the global user group, a first user number of the target user group and a second user number of the global user group, and calculate, according to the first downloaded times, the second downloaded times, the first user number and the second user number, the differentiation degree between the download resource in the target user group and that in the global user group.

In one example, the differentiation degree generating module 106 may calculate the differentiation degree according to a following formula:

$$diff = \frac{(R1 - R2)}{\sqrt{\frac{R1 \times (1 - R1)}{M1} + \frac{R2 \times (1 - R2)}{M2}}}.$$

Wherein diff denotes the differentiation degree between the download resource in the target user group and that in the global user group. M1 denotes the first user number of the target user group. M2 denotes the second user number of the global user group. R1=N1/M1, wherein R1 denotes an average downloaded times of download resource R in the target user group, N1 denotes the first downloaded times of the download resource R in the target user group; R2=N2/M2, wherein R2 denotes an average downloaded times of download resource R in the global user group, N2 denotes the first downloaded times of the download resource R in the global user group.

When R1>R2, diff is a positive number, which indicates that the target user group prefers the download resource R. The larger the value of diff, the download resource R is more worthy to be recommended. When R1<R2, diff is a negative number, which indicates that the target user group do not prefer the download resource R. The smaller the value of diff, the download resource R is less worthy to be recommended.

The denominator acts as a gain factor, avoiding that R1 and R2 becomes too small when M1 and M2 are large, which will result in an unobvious differentiation degree.

Figure 3:
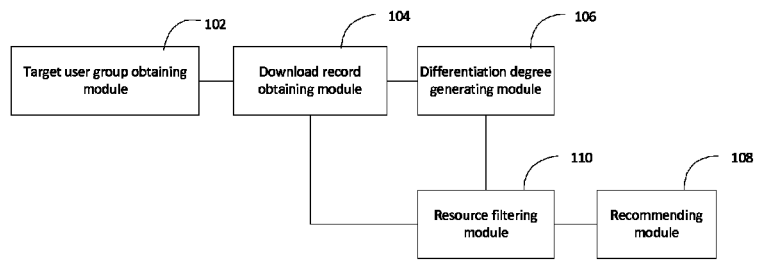
FIG. 3 is a schematic diagram illustrating a system for recommending a download resource according to another example of the present disclosure.

In one example, as shown in FIG. 3, the download resource recommendation system may further include a resource filtering module 110, adapted to determine the downloaded times of download resources in the download records of the target user group, and select download resources whose downloaded times are higher than a first threshold in the download records of the target user group.

In particular, the resource filtering module 110 may traverse the download record of each user before generating the differentiation degree and after obtaining the download records of the users, accumulate the downloaded times of all users with respect to one download resource and determine the downloaded times of the download resource in the target user group. Then, the download resources are sorted according to their downloaded times. The download resources whose downloaded times exceed the first threshold are retrieved as hot resources of the target user group.

When generating the differentiation degree, operations may be performed merely based on the hot resources of the target user group.

Through selecting the hot resources, the amount of data need to be processed during the generation of the differentiation degree is reduced, which lowers the scale of the computation and reduces unnecessary performance loss.

The recommending module 108 is adapted to sort the download resources according to their differentiation degrees, and recommend the top-ranking predetermined number of download resources to the user.

After the download resources are traversed, the recommending module 108 may sort the download resources according to their differentiation degrees in a descending order. Then top N download resources, i.e., download resources ranking in the first N are recommended to the user, wherein N is a predefined natural number.

Preferably, the recommending module 108 may display the number, size, and downloaded times of the download resources in a user interface according to their differentiation degrees in the descending order, so as to facilitate the user to select and download.

In one example, as shown in FIG. 3, the resource filtering module 110 is further adapted to select download resources in the target user group with differentiation degrees higher than a second threshold.

Through filtering the download resources with small differentiation degrees before the sorting operation, the number of download resources need to be sorted is reduced. Thus, the sorting efficiency is increased.

In the download resource recommendation method, system and storage medium provided by examples of the present disclosure, a target user group that a target user belongs to is obtained according to a download record of the target user. Then, according to a differentiation degree between downloaded times in the target user group and that in the global user group, a proper download resource is recommended to the target user. The target user has similar interest on the download resources with other users in the target user group. Therefore, if the differentiation degree between a download resource in the target user group and that in the global user group is relative large, the target user may be more interested in this download resource than users in the global user group. Thus, the accuracy ratio for recommending download resource to the target user is increased.

An example of the present disclosure further provides a computer readable storage medium including a set of instructions executable by one or more processors to perform the download resource recommendation method. Those skilled in the art would know that all or some of the blocks in the above method examples may be implemented by a computer program executed on relevant hardware. The program may be stored in a computer readable storage medium. When the program is executed, the method as described in the above examples is implemented. The storage medium may be a disk, a compact disk, read-only memory (ROM), or random access memory (RAM), etc.

Those with ordinary skill in the art would know that all or some of the blocks of the present disclosure may be implemented by hardware, or implemented by a program executed on a relevant hardware. The program may be stored on a computer readable storage medium, such as a read only memory (ROM)/random access memory (RAM), disk or compact disk, etc.

What has been described and illustrated herein is a preferred example of the disclosure along with some of its variations. Many variations are possible within the scope of the disclosure, which is intended to be defined by the following claims—and their equivalents—in which all terms are meant in their broadest reasonable sense unless otherwise indicated.

The invention claimed is:

1. A method for recommending a download resource, comprising:
  obtaining a download record of a target user, obtaining a target user group associated with the target user according to the download record;
  obtaining download records of the target user group and download records of a global user group;
  processing the download records of the target user group and the download records of the global user group to generate, for a download resource in the download records of the target user group, a differentiation degree between the download resource in the download records of the target user group and the download resource in the download records of the global user group; and
  sorting download resources according to the differentiation degree, and recommending the top-ranking predetermined number of download resources to the target user;
  wherein the obtaining the target user group associated with the target user according to the download record comprises:
  obtaining download records of recent users;
  traversing the download records of the users, for one download record of each of the users, performing a following operation:
  comparing the download record of the user with the download record of the target user, obtaining the user whose download record matches with the download record of the target user, and adding the obtained user into the target user group.

2. The method of claim 1, wherein the obtaining the download records of the recent users comprises:
  obtaining the download records of recent active users.

3. The method of claim 1, wherein the comparing the download record of the user with the download record of the target user and obtaining the user whose download record matches with the download record of the target user comprises:
  obtaining a resource hash value and/or resource file name of one download resource in the download records of the users;
  comparing the resource hash value and/or resource name of the download resource in the download records of the users with a resource hash value and/or resource file name of one download resource in the download record of the target user, obtaining the user whose resource hash value and/or resource file name match with those of the target user.

4. The method of claim 3, wherein the comparing the download record of the user with the download record of the target user and obtaining the user whose download record matches with the download record of the target user further comprises:
  determining whether the resource file name of the download resource in the download records of the users matches with the resource file name of the download resource in the download record of the target user adopting a maximum common sub-string method.

5. The method of claim 1, wherein the processing the downloading records of the target user group and the download records of the global user group to generate, for the download resource in the download records of the target user group, the differentiation degree of the download resource in the download records of the target user group and the download resource in the download records of the global user group comprises:
  determining a downloaded times of the download resource in the download records of the target user group;
  selecting download resources whose downloaded times exceed a first threshold in the download records of the target user group.

6. The method of claim 5, wherein the processing the downloading records of the target user group and the download records of the global user group to generate, for the download resource in the download records of the target user group, the differentiation degree of the download resource in the download records of the target user group and the download resource in the download records of the global user group comprises:
  obtaining first downloaded times of the download resource in the download records of the target user group, a second downloaded times of the download resource in the download records of the global user group;
  obtaining a first user number of the target user group and a second user number of the global user group; and
  calculating according to the first downloaded times, the second downloaded times, the first user number and the second user number to determine the differentiation degree between the download resource in the target user group and that in the global user group.

7. The method of claim 6, wherein the calculating according to the first downloaded times, the second downloaded times, the first user number and the second user number to determine the differentiation degree between the download resource in the target user group and that in the global user group comprises:
  calculating according to a following formula:

$$\mathit{diff} = \frac{(R1 - R2)}{\sqrt{\frac{R1 \times (1 - R1)}{M1} + \frac{R2 \times (1 - R2)}{M2}}};$$

wherein diff denotes the differentiation degree between the download resource in the target user group and that in the global user group; M1 denotes the first user number of the target user group; M2 denotes the second user number of the global user group;

R1=N1/M1, wherein R1 denotes an average downloaded times of download resource R in the target user group, N1 denotes the first downloaded times of the download resource R in the target user group; R2=N2/M2, wherein R2 denotes an average downloaded times of the download resource R in the global user group, N2 denotes the first downloaded times of the download resource R in the global user group.

8. The method of claim 6, further comprising:
before sorting the download resources according to the differentiation degree,
selecting the download resources whose differentiation degrees are larger than a second threshold in the target user group.

9. A system for recommending a download resource, comprising: a processor and a memory coupled to the processor, wherein program modules are stored in the memory and to be executed by the processor, the program modules comprise:
a target user group obtaining module, adapted to obtain a download record of a target user and obtain a target user group associated with the target user according to the download record;
a download record obtaining module, adapted to obtain download records of the target user group and download records of a global user group;
a differentiation degree generating module, adapted to process the download records of the target user group and the download records of the global user group, so as to generate, for a download resource in the download records of the target user group, a differentiation degree between the download resource recorded in the download records of the target user group and the download resource recorded in the download records of the global user group; and
a recommending module, adapted to sort download resources according to the differentiation degree, and recommend the top-ranking predetermined number of download resources to the target user;
wherein the target user group obtaining module is further adapted to
obtain download records of recent users;
traverse the download records of the users, perform a following operation for a download record of each of the users:
compare the download record of the user with the download record of the target user, obtain the user whose download record matches with the download record of the target user, and add the obtained user into the target user group.

10. The system of claim 9, wherein the target user group obtaining module is further adapted to obtain the download records of recent active users.

11. The system of claim 9, wherein the target user group obtaining module is further adapted to
obtain a resource hash value and/or resource file name of one download resource in the download records of the users;
compare the resource hash value and/or resource name of the download resource in the download records of the users with a resource hash value and/or resource file name of one download resource in the download record of the target user, obtain the user whose resource hash value and/or resource file name matches with those of the target user.

12. The system of claim 11, wherein the target user group obtaining module is further adapted to determine whether the resource file name of the download resource in the download records of the users matches with the resource file name of the download resource in the download record of the target user adopting a maximum common sub-string method.

13. The system of claim 9, further comprising:
a resource filtering module, adapted to determine a downloaded times of the download resource in the download records of the target user group, and select download resources whose downloaded times exceed a first threshold in the download records of the target user group.

14. The system of claim 13, wherein the differentiation degree generating module is further adapted to
obtain first downloaded times of the download resource in the download records of the target user group, a second downloaded times of the download resource in the download records of the global user group;
obtain a first user number of the target user group and a second user number of the global user group; and
calculate according to the first downloaded times, the second downloaded times, the first user number and the second user number to determine the differentiation degree between the download resource in the target user group and that in the global user group.

15. The system of claim 14, wherein the differentiation degree generating module is further adapted to calculate the differentiation degree according to a following formula:

$$diff = \frac{(R1 - R2)}{\sqrt{\frac{R1 \times (1 - R1)}{M1} + \frac{R2 \times (1 - R2)}{M2}}};$$

wherein diff denotes the differentiation degree between the download resource in the target user group and that in the global user group; M1 denotes the first user number of the target user group; M2 denotes the second user number of the global user group;
R1=N1/M1, wherein R1 denotes an average downloaded times of download resource R in the target user group, N1 denotes the first downloaded times of the download resource R in the target user group; R2=N2/M2, wherein R2 denotes an average downloaded times of the download resource R in the global user group, N2 denotes the first downloaded times of the download resource R in the global user group.

16. The system of claim 14, wherein the resource filtering module is further adapted to select the download resources whose differentiation degrees are larger than a second threshold in the target user group.

17. A non-transitory computer readable storage medium comprising a set of computer executable instructions, the computer executable instructions are executed to perform a method for recommending a download resource, the method comprises:
obtaining a download record of a target user, obtaining a target user group associated with the target user according to the download record;
obtaining download records of the target user group and download records of a global user group;
processing the download records of the target user group and the download records of the global user group to generate, for a download resource in the download records of the target user group, a differentiation degree between the download resource in the download records of the target user group and the download resource in the download records of the global user group; and
sorting download resources according to the differentiation degree, and recommending the top-ranking predetermined number of download resources to the target user;

wherein the obtaining the target user group associated with the target user according to the download record comprises:

obtaining download records of recent users;

traversing the download records of the users, for one download record of each of the users, performing a following operation:

comparing the download record of the user with the download record of the target user, obtaining the user whose download record matches with the download record of the target user, and adding the obtained user into the target user group.

18. The non-transitory computer readable storage medium of claim 17, wherein the comparing the download record of the user with the download record of the target user and obtaining the user whose download record matches with the download record of the target user comprises:

obtaining a resource hash value and/or resource file name of one download resource in the download records of the users;

comparing the resource hash value and/or resource name of the download resource in the download records of the users with a resource hash value and/or resource file name of one download resource in the download record of the target user, obtaining the user whose resource hash value and/or resource file name match with those of the target user.

19. The non-transitory computer readable storage medium of claim 18, wherein the comparing the download record of the user with the download record of the target user and obtaining the user whose download record matches with the download record of the target user further comprises:

determining whether the resource file name of the download resource in the download records of the users matches with the resource file name of the download resource in the download record of the target user adopting a maximum common sub-string method.

20. The non-transitory computer readable storage medium of claim 17, wherein the processing the downloading records of the target user group and the download records of the global user group to generate, for the download resource in the download records of the target user group, the differentiation degree of the download resource in the download records of the target user group and the download resource in the download records of the global user group comprises:

determining a downloaded times of the download resource in the download records of the target user group;

selecting download resources whose downloaded times exceed a first threshold in the download records of the target user group.

* * * * *